US008626562B2

(12) United States Patent
Milman et al.

(10) Patent No.: US 8,626,562 B2
(45) Date of Patent: Jan. 7, 2014

(54) COLLECTION AND PROCESSING OF PRODUCT CONSUMPTION TIMELINES

(75) Inventors: Ilya Milman, San Francisco, CA (US); Pavel Kalinin, San Mateo, CA (US); Vadim Kagansky, San Francisco, CA (US)

(73) Assignee: Wal-Mart Stores, Inc., Bentonville, AR (US)

(*) Notice: Subject to any disclaimer, the term of this patent is extended or adjusted under 35 U.S.C. 154(b) by 0 days.

(21) Appl. No.: 13/397,326

(22) Filed: Feb. 15, 2012

(65) Prior Publication Data
US 2013/0211875 A1 Aug. 15, 2013

(51) Int. Cl.
*G06Q 10/00* (2012.01)
(52) U.S. Cl.
USPC ........................................ 705/7.29; 705/26.7
(58) Field of Classification Search
USPC ............................................. 705/7.29, 26.7
See application file for complete search history.

(56) References Cited

U.S. PATENT DOCUMENTS

| 6,123,259 A * | 9/2000 | Ogasawara ................... 235/380 |
| 7,130,814 B1 * | 10/2006 | Szabo et al. ................. 705/26.8 |
| 7,353,194 B1 * | 4/2008 | Kerker et al. ................... 705/29 |
| 7,386,485 B1 * | 6/2008 | Mussman et al. ............ 705/14.1 |
| 7,580,861 B1 * | 8/2009 | Song .......................... 705/26.35 |
| 2006/0247985 A1 * | 11/2006 | Liamos et al. .................. 705/28 |

OTHER PUBLICATIONS

Utaka, Atsuo. "Planned Obsolescence and Marketing Strategy." Managerial and Decision Economics. 21: 339-344 (2000).*

* cited by examiner

*Primary Examiner* — Susanna M Meinecke Diaz
(74) *Attorney, Agent, or Firm* — David R. Stevens; Stevens Law Group

(57) ABSTRACT

Disclosed herein are apparatus and methods for collecting and utilizing product consumption cycle information from product purchasers. In one example a method comprises, responsive to a purchase of a product by a purchaser, selecting an end of use criteria for the product from a plurality of end of use criteria, determining a length of a consumption cycle of the product based on the end of use criteria, recording information identifying the purchaser, the product, and the length of the consumption cycle in an electronic database, and contacting the purchaser proximate expiration of the consumption cycle.

20 Claims, 2 Drawing Sheets

COLLECTION AND PROCESSING OF PRODUCT CONSUMPTION TIMELINES

BACKGROUND OF INVENTION

Aspects and embodiments of the present invention are directed generally to methods and apparatus for collecting information related to product consumption timelines from purchasers of products and utilizing the information collected.

SUMMARY OF INVENTION

In accordance with an aspect of the present invention, there is provided computer-a implemented method for the collection and processing of product consumption timelines. The method comprises, responsive to a purchase of a product by a purchaser, selecting an end of use criteria for the product from a plurality of end of use criteria, determining a length of a consumption cycle of the product based on the end of use criteria, recording information identifying the purchaser, the product, and the length of the consumption cycle in an electronic database, and contacting the purchaser proximate expiration of the consumption cycle.

In accordance with some embodiments the consumption cycle is defined by a period of time.

In accordance with some embodiments the consumption cycle is defined by a usage pattern associated with the product.

In accordance with some embodiments determining the length of the consumption cycle of the product comprises receiving an indication of the length of the consumption cycle from the purchaser.

In accordance with some embodiments the method further comprises requesting information regarding the length of the consumption cycle from the purchaser.

In accordance with some embodiments the indication of the length of the consumption cycle is received from the purchaser through an interface of an electronic medium through which the purchase of the product is performed.

In accordance with some embodiments the information regarding the length of the consumption cycle comprises a projected length of the consumption cycle.

In accordance with some embodiments the information regarding the length of the consumption cycle comprises an actual length of a prior consumption cycle for a product substantially similar to the product purchased.

In accordance with some embodiments selecting an end of use criteria for the product comprises receiving an indication of the end of use criteria from the purchaser.

In accordance with some embodiments the end of use criteria is selected from a predefined list of end of use criteria.

In accordance with another aspect, there is provided a system facilitating the collection and analytical processing of product consumption timelines. The system comprises an interface and a processor coupled to the interface and configured, responsive to a purchase of a product by a purchaser, to select an end of use criteria for the product from a plurality of end of use criteria, determine a length of a consumption cycle of the product based on the end of use criteria, record information identifying the purchaser, the product, and the length of the consumption cycle in an electronic database, and cause the purchaser to be contacted proximate expiration of the consumption cycle.

In accordance with some embodiments the processor selects the end of use criteria responsive to receiving an indication of the end of use criteria from the purchaser.

In accordance with some embodiments the processor determines the length of the consumption cycle of the product responsive to receiving an indication of the length of the consumption cycle from the purchaser.

In accordance with some embodiments the processor is further configured to request information regarding the length of the consumption cycle from the purchaser.

In accordance with some embodiments the information regarding the length of the consumption cycle comprises a projected length of the consumption cycle.

In accordance with some embodiments the information regarding the length of the consumption cycle comprises an actual length of a prior consumption cycle for a product substantially similar to the product purchased.

In accordance with another aspect, there is provided a computer readable medium having stored thereon sequences of instruction including instructions that will cause a processor to, responsive to a purchase of a product by a purchaser, select an end of use criteria for the product from a plurality of end of use criteria, determine a length of a consumption cycle of the product based on the end of use criteria, record information identifying the purchaser, the product, and the length of the consumption cycle in an electronic database, and cause the purchaser to be contacted proximate expiration of the consumption cycle.

In accordance with some embodiments the instructions will further cause the processor to request information regarding the length of the consumption cycle from the purchaser, and determine the length of the consumption cycle of the product responsive to receiving the information regarding the length of the consumption cycle from the purchaser.

In accordance with some embodiments the instructions will further cause the processor to request information regarding the end of use criteria from the purchaser, and select the end of use criteria for the product responsive to receiving the information regarding the end of use criteria from the purchaser.

In accordance with some embodiments causing the purchaser to be contacted proximate expiration of the consumption cycle comprises causing the processor to electronically contact the purchaser proximate expiration of the consumption cycle.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
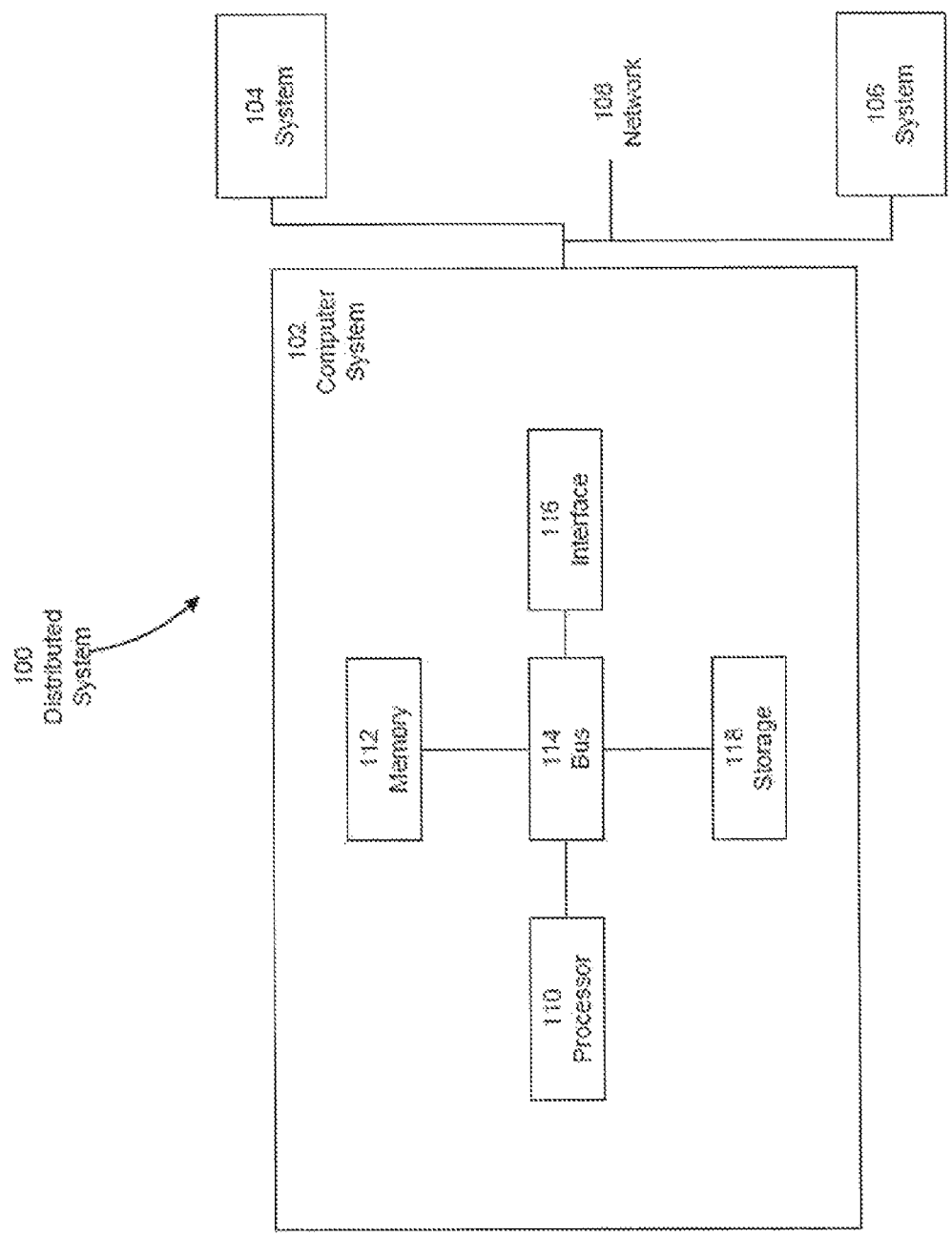
FIG. 1 is a block diagram of one example of a computer system with which various aspects in accord with the present invention may be implemented.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

The retail industry is dependent on reliable projection of demand in various types of consumer goods to maintain adequate stocks of the goods and establish efficient reorder points and reorder frequencies. Reliable projects of demand may also facilitate increasing sales by providing for a retailer to effectively time activities such as the distribution of promotional offers or advertising. A large portion of demand projections for various goods is based on past trends in sales of identical or comparable products. At least some aspects and embodiments of apparatus and methods in accordance with the present invention facilitate the prediction of demand for various goods using objective means of statistical methods. These statistical methods may utilize community-supplied data as an input.

Aspects and embodiments of the present invention may provide for both retailers and consumers to benefit from the ability to more accurately project demand for products. Aspects and embodiments of the present invention may provide for consumers to make more informed purchasing decisions. An additional benefit of aspects and embodiments of the present invention is facilitation of the ability to promote environmentally sustainable practices which may be beneficial for local communities.

Computer System

Various aspects and functions described herein in accordance with the present embodiments may be implemented as hardware or software on one or more computer systems or electronic devices. There are many examples of computer systems currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

FIG. 1 shows a block diagram of a distributed computer system 100, in which various aspects and functions in accord with the present embodiments may be practiced. Distributed computer system 100 may include one more computer systems. For example, as illustrated, distributed computer system 100 includes computer systems 102, 104, and 106. As shown, computer systems 102, 104, and 106 are interconnected by, and may exchange data through, communication network 108. Network 108 may include any communication network through which computer systems may exchange data. To exchange data using network 108, computer systems 102, 104, and 106 and network 108 may use various methods, protocols and standards, including, among others, token ring, Ethernet, wireless Ethernet, Bluetooth, TCP/IP, UDP, Http, FTP, SNMP, SMS, MMS, SS7, Json, Soap, and Corba. To ensure data transfer is secure, computer systems 102, 104, and 106 may transmit data via network 108 using a variety of security measures including TLS, SSL or VPN among other security techniques. While distributed computer system 100 illustrates three networked computer systems, distributed computer system 100 may include any number of computer systems and computing devices, networked using any medium and communication protocol.

Various aspects and functions in accordance with the present embodiments may be implemented as specialized hardware or software executing in one or more computer systems including computer system 102 shown in FIG. 1. As depicted, computer system 102 includes processor 110, memory 112, bus 114, interface 116, and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor, multi-processor, microprocessor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile, non-transitory, storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI, and InfiniBand. Thus, bus 114 enables communications, for example, data and instructions, to be exchanged between system components of computer system 102.

Computer system 102 also includes one or more interface devices 116 such as input devices, output devices, and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable, nonvolatile, non-transitory, storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk, or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then may copy the data to the medium associated with storage system 118 after processing is completed. A variety of components may manage data movement between the medium and integrated circuit memory element and the presently described embodiments are not limited thereto. Further, the embodiments are not limited to a particular memory system or data storage system.

Although computer system 102 is shown by way of example as one type of computer system upon which various aspects and functions in accordance with the present embodiments may be practiced, any aspects of the presently disclosed embodiments are not limited to being implemented on the computer system as shown in FIG. 1. Various aspects and functions in accord with the presently disclosed embodiments may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system such as Windows NT, Windows 2000 (Windows ME), Windows XP, or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written.

These component applications may be executable, intermediate, for example, C–, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML, or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB, a subsidiary of Oracle or integration software such as Web Sphere middleware from IBM of Armonk, N.Y. However, a computer system running, for example, SQL Server may be able to support both aspects in accord with the presently disclosed embodiments and databases for sundry applications.

One or more embodiments of the present invention may be implemented in the form of several interacting subsystems responsible for various functions including, for example, data gathering, persistent storage, aggregation and analytics, call-to-action customer facing functionality (site or promotional messaging), and configuration and maintenance.

Some embodiments of methods and systems in accordance with the present invention may utilize a limited number of data elements, such as data type (projected/actual), consumption cycle measuring unit, consumption cycle measuring unit value, end of use reason, end of cycle destination, data submission date, customer identification, and product identification.

Some of the subsystems above can be implemented as enhancement of existing processes/systems rather than isolated products.

Consumption Timeline Assessment Methodology

Some aspects and embodiments of the present invention provide for customers to submit information about expected and/or actual product consumption cycles. The information may be submitted electronically or may be submitted through interaction with a human agent of a retailer. As used herein, a product consumption cycle (also referred to as a product consumption timeline) may be defined in terms of a time period over which a product is used, as measured in, for example days, months or years. A product consumption cycle may also be defined in terms of a number of uses or amount of use a product is subject to prior to the end of the useful life of that product, for example, a number of washes for a pair of jeans, riding distance for a bicycle, or miles travelled for car tires.

Products may reach the end or the expiration of a consumption cycle for a number of reasons. For example, a product may become obsolete or out of fashion. For some types of products, for example, children's clothes, the product may be outgrown after a certain period of time. For other types of products, for example, paper towels, food products, or other products which may be used up or fully consumed, a consumption cycle may end when the product is fully consumed. A consumption cycle for a product may also end when a product breaks or becomes worn out or technologically obsolete. A reason for a product reaching the end or expiration of a consumption cycle is referred to herein as an "end of use criteria."

When product use comes to an end, the product may be dispensed with in a number of different manners. For some products, upon expiration of a consumption cycle, the product may be disposed of as trash and sent to, for example, a landfill or a waste processing facility. Other products, for example, those including a substantial amount of recyclable material such as metal, paper, or cardboard may be recycled, in whole or in part. Other products, for example, clothes that are outgrown, may be donated to charity. The fate of a product subsequent to the expiration of a consumption cycle for that product is referred to herein as an "end of consumption cycle destination."

In some aspects and embodiments of the present invention customers may submit information about expected and/or actual product consumption cycles through a website on the internet, for example, an e-commerce website through which the customers may purchase products. Customers may also, or alternatively, submit this information in an electronic mail (e-mail) message, in a paper survey or questionnaire, or in a conversation with an agent of a retailer. In various embodiments, this information can be captured using any method/technology for capturing the input of a product purchaser. Information submitted by customers can be stored, processed, and used for multiple purposes in serving e-commerce customers as well as customers purchasing similar products in physical "brick-and-mortar" stores.

Systems in accordance with various aspects and embodiments of the present invention may utilize one or more data repositories containing available options for consumption cycle predictions and/or measurements for various product categories. Systems in accordance with various aspects and embodiments of the present invention may include functionality to maintain and expand the one or more data repositories as needed.

Information collected regarding product consumption cycles may in various aspects and embodiments of the present invention be used for one or more purposes. These purposes may include, for example, evaluating customer expectations, evaluating product quality (for example, expected vs. actual product lifetime), identifying marketing opportunities for warranty sales, performing a comparison of product usage patterns across demographic groups, and marketing product upgrades to customers who indicated obsolete technology as an end of use criteria prior to or proximate the predicted end of use date. Information collected regarding product consumption cycles may in various aspects and embodiments be additionally or alternatively used for marketing product upgrades to customers who previously bought products indicated as obsolete technology by other customers, encouraging charitable giving of products approaching the end of a consumption cycle, and promoting sustainable practices (reuse/recycle) of products approaching the end of a consumption cycle.

Data input may be solicited at various points in the purchase process, including, for example, by order confirmation e-mail, customer surveys, customer rating and review submission, directly on the product page of an e-commerce website, and targeted e-mail campaigns.

Raw data gathered in various aspects and embodiments of the present invention may be merged with other enterprise data, for example, product and customer data, to produce actionable insights in areas of marketing, supplier relationship, customer service, product strategy, etc.

Figure 2:
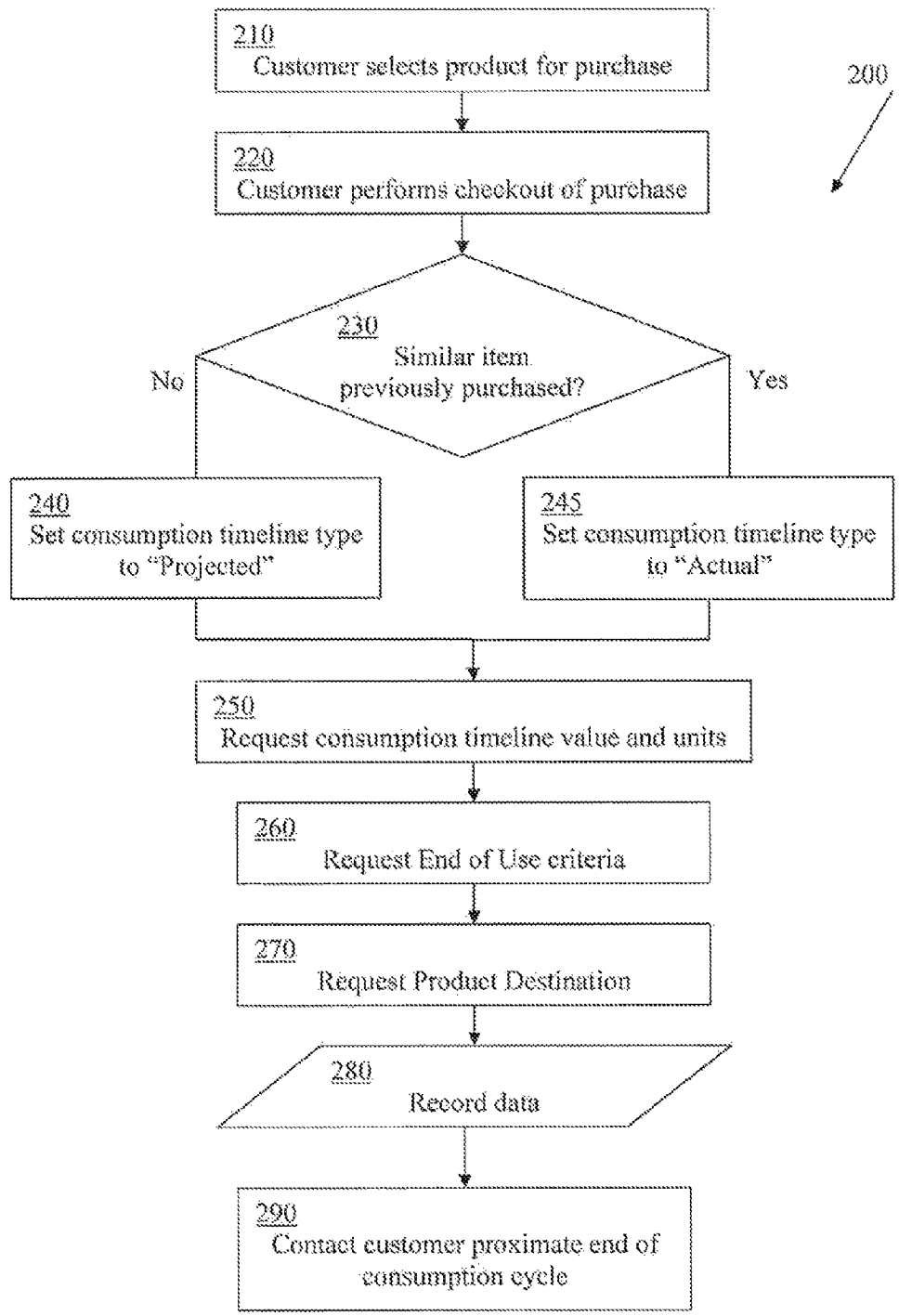
FIG. 2 is a flowchart of a process in accordance with one example.

A method in accordance with one or more embodiments of the present invention is illustrated in the flowchart 200 of FIG. 2. This flowchart is exemplary of a particular embodiment. In other embodiments the acts depicted may be performed in alternate orders. In some embodiments not all acts depicted need be performed. Additional or substitute acts may be included in some embodiments. IN at least one embodiment some or all of the acts described in FIG. 2 are performed using one or more computer systems such as one of those described above.

At act 210, a customer selects a product for purchase. The selection of the item for purchase may be made, for example, through a website or in a physical retail store. Selecting the item for purchase may include adding the item to a virtual shopping cart in an electronic medium such as an e-commerce website. Selecting the item for purchase may, in an instance where the customer is shopping in a physical store, include selecting a physical product for purchase.

In act 220, the customer purchases the product by performing a checkout procedure. The checkout procedure may be performed online, for example, when a customer is shopping through an e-commerce website. In a physical store, the checkout procedure may be performed electronically by the customer using a smart phone or other mobile electronic device. Prior to or during electronic checkout, the customer may be requested to enter information identifying the customer, for example, the customer's e-mail address and/or physical address. This information may be utilized for sending an order confirmation to the customer, for determining where to ship a purchased item, and/or for performing follow up contact with the customer as described in more detail below. The checkout procedure may also be performed at a physical cash register in a physical store. Information such as the customer's e-mail or physical address may be collected during checkout at a physical cash register. If an electronic payment method, for example, a credit card, is used during checkout at a physical cash register, customer information previously associated with the credit card, for example, the customer's contact information, may be automatically associated with the purchase.

In act 230, a determination is made as to whether the product being purchased is similar or identical to a previously purchased item. This determination may be made automatically by electronically querying a product purchase history for the customer. This product history may be available in a data archive of an e-commerce website, or may be obtained from an archive of purchases associated with a customer's credit card or other payment method. If a product history for the customer is not available or if no record of a previous similar purchase is found, the customer may be asked if the current purchase is a repeat purchase or if the product is being purchased to replace a similar product which has reached the end of its consumption cycle.

If the customer is purchasing a product which is not similar to a previously purchased product, a consumption cycle type for product consumption data to be gathered may be set to "Projected." (act 240.) If the customer is purchasing a product which is similar or identical to a previously purchased product, a consumption cycle type for product consumption data to be gathered may be set to "Actual." (act 245.)

In act 250 the customer is asked to provide information regarding the value and units for the consumption cycle of the product. The value may be a numerical value, and the units may be a unit of time. For example, the customer may specify that the consumption cycle for the product is a certain number of days or months. The value and units may also reflect a usage-based consumption cycle. For example, the customer may specify that the consumption cycle for the product is a certain number of uses. The consumption cycle value and units supplied may be an estimate of an actual consumption cycle of a previously purchased product if the product being purchased is similar to the previously purchased product. In some embodiments, where an electronic record of a previous purchase of the similar or identical product is available, the actual consumption cycle may be automatically calculated. If the product being purchased is not similar to a previously purchased product, the consumption cycle value and units may reflect a projected consumption cycle, for example, a time period which the customer believes that the item will be used for before being disposed of, fully consumed, or replaced.

At act 260 the customer may be requested to specify an end of use criteria for the product being purchased. The end of use criteria may be selected from a list of predefined end of use criteria. In some embodiments, a customer may specify an end of use criteria in natural language rather than selecting from a list of predefined end of use criteria. In some embodiments, the natural language end of use criteria provided by the customer may be matched to the most similar end of use criteria in a list of predefined end of use criteria. This most similar end of use criteria may then be associated with the purchase. In some embodiments software such as natural language recognition software may be used to map the natural language end of use criteria provided by the customer to a predefined end of use criteria. Either the natural language end of use criteria or the predefined end of use criteria may be associated with the purchase and recorded.

A first predefined end of use criteria may be "Obsolete Technology." This end of use criteria may be selected if the customer anticipates that there would be improvements in the type of product being purchased that would compel the customer to purchase a replacement product including the improvements after a period of time. For example, a customer may select this end of use criteria if the customer is purchasing a computer and the customer expects that sufficient advances in computer technology may occur in the next five years such that the customer would plan to purchase an improved computer in five years.

A second predefined end of use criteria may be "Fully Consumed." This end of use criteria may be selected if the customer anticipates that the product being purchased may be fully used up during the consumption cycle. For example, a customer may select this end of use criteria if the customer anticipates that a food item such as a bag of dog food would be entirely eaten by the customer's dog during the consumption cycle.

Another predefined end of use criteria may be "Consumer Match." This end of use criteria may be selected if there is some external factor that may render the product being purchased unsuitable or undesirable at the end of the consumption cycle. For example, a customer may select this end of use criteria if the customer is purchasing an item of clothing reflecting a presently popular fashion trend. The customer may expect that the item of clothing may become out of fashion in the next season. In another example, the customer may be purchasing an item such as a calendar which is only useful for a particular time period. In a further example, the customer may be purchasing a toy or other item for a child and may expect the child to outgrow the toy or other item after a particular time period or after reaching a certain age. The Consumer Match end of use criteria may include subcategories such as "Fashion," "Calendar Year," or "Age" which may be appropriate for these respective examples.

Another predefined end of use criteria may be "Product Breaks." This end of use criteria may be selected if the customer anticipates that the product being purchased may break or become useless for its intended purpose at the end of the consumption cycle. For example, a customer may select this end of use criteria if, for example, the customer was purchasing a product such as sneakers or car tires, and the customer expected the product to become useless due to being worn out after a certain amount of time or a certain distance travelled.

Additional or alternative end of use criteria may be defined based upon the particular details of implementation of embodiments of the disclosed method and/or apparatus. The end of use criteria may also be selected based on an actual cause for a product reaching the end of a consumption cycle, for example when a customer is purchasing a replacement or substitute product similar or identical to a previously purchased product.

In act 270, the customer may be requested to specify a product destination for the product purchased. The product destination represents what the customer intends to do with the product at the end of the consumption cycle for the product. Examples of product destinations that may be specified include, for example, "Donation," "Recycle," and "Dispose of." The Donation product destination may be specified if the customer intends to donate the product when it reaches the end of its consumption cycle. For example, a customer may purchase children's clothing and intend to donate it to a charity when it is outgrown. The Recycle product destination may be specified if the product purchased includes a substantial amount of recyclable material and the customer intends to recycle the product when it reaches the end of its consumption cycle. For example, the product may be a consumer electronics product which the customer intends to give to an electronics recycler when it reaches the end of its consumption cycle. The Dispose of product destination may be specified if the consumer intends to throw out the product when it reaches the end of its consumption cycle.

The product destination may in some embodiments be selected from a predetermined list of product destinations. Options of "N/A" and/or "Not Specified" may also be available. Such options may be appropriate for example, for products such as food items which are consumed during a consumption cycle. Additional or alternative product destinations may be defined based upon the particular details of implementation of embodiments of the disclosed method and/or apparatus. In some embodiments, a customer may specify a product destination in natural language rather than selecting from a list of predefined product destinations. In some embodiments, the natural language product destination provided by the customer may be matched to the most similar product destination in a list of predefined product destinations. This most similar product destination may then be associated with the purchase. In some embodiments software such as natural language recognition software may be used to map the natural language product destination provided by the customer to a predefined product destination. Either the natural language product destination or the predefined product destination may be associated with the purchase and recorded.

Upon receipt of input regarding the consumption timeline type, consumption timeline value and units, end of use criteria, and product destination, data based on this input may be stored in a database. (act 280.) This data may be associated with an identifier of the customer who provided the input and/or the product purchased and/or the date of purchase of the product.

In various embodiments, the collection of information in any one or more of acts 230-270 may be performed before or during checkout of a product or after purchase of the product. For example, if purchasing a product through an electronic medium or through a website, the customer may be queried for this information as part of the checkout procedure. The customer may be queried for this information during checkout of a product at a physical cash register. In other embodiments, the customer may be sent a questionnaire in the form of, for example, an e-mail, post card, telephone call, or other form requesting information regarding the consumption cycle of the product subsequent to completing purchase of the product.

Proximate the end of a consumption cycle for a purchased product, the customer who purchased the product may be contacted. (act 290.) This contact may be made through any one or more of various media including, for example, e-mail, postal mail, telephone call, or any other method of contact. The contact may include a message related to the product which was purchased. The message may be determined in part based on one or more of the type of product, the specified end of use criteria for the product, and the specified product destination for the product, or any other information related to the consumption cycle for the product. The timing of the contact may be set such that it is made just prior to, at the time of, or just after the expiration of the consumption cycle of the product. For example, the contact may be made within a number of days prior to the expiration of the consumption cycle for the product.

In some embodiments, a statistical standard deviation in product consumption cycles for a product may be calculated from data supplied by customers or otherwise. A customer may be contacted at a time based on the specified product consumption cycle for the product and the standard deviation in product consumption cycles for the product purchased or for similar products. For example, a customer may be contacted at a time determined by the product consumption cycle specified by the customer for the product minus two standard deviations in a product consumption cycle for one or more similar products.

The message sent to the customer may include a marketing offer. For example, if the end of use criteria for a purchased product was determined to be Obsolete Technology the customer could be sent a message describing new technology in an upgraded product similar to the purchased product. If the end of use criteria determined was Consumer Match (age) and the product was children's clothes the customer could be sent a message describing children's clothing which was available for a child in a higher age range than the previously purchased clothes. If the end of use criteria determined was Consumer Match (fashion), the customer could be sent a message describing a product similar to the previously purchased product which was determined to be in fashion during the season in which the message was sent. If the product destination was determined to be Donation or Recycle, the customer may be sent a message including recommendations for local charities or local recycling centers where the customer could deliver the product upon expiration of the product consumption cycle.

The following examples describe further possible scenarios and possible responses to an end of consumption cycle event approaching or being reached:

Example 1

Proposal to Upgrade Previously Bought Item

Based on Prior Customer Input:

| Type | Value | Units | End of Use | Destination | Submitted | Customer | Product |
|---|---|---|---|---|---|---|---|
| Projected | 30 | Months | Obsolete Technology | Donation | Jan. 01, 2012 | Joe S. | XYZ TV Q12011 |

A customer buys a TV of a particular brand/model. At the time of purchase or shortly thereafter, he/she supplies a projected consumption cycle for that product, indicating he/she expects to keep the TV for 2.5 years (30 months) and then replace it with a newer model. Shortly prior to those 30 months passing, the customer may be sent a marketing offer for an upgrade, possibly for a newer, more advanced model. The customer may be sent, for example, an e-mail with a message such as "Please check out new XYZ Brand TV (model Q32013) coming out in July 2014." The customer may also be provided with a hyperlink to information about the new model of TV.

Example 2

Proposal to Donate to Charity

Based on Prior Customer Input:

| Type | Value | Units | End of Use | Destination | Submitted | Customer | Product |
|---|---|---|---|---|---|---|---|
| Projected | 30 | Months | Obsolete Technology | Donation | Jan. 01, 2012 | Jane A. | XYZ TV Q12011 |

At the time of purchase or thereafter, a customer indicates that the projected end of consumption cycle destination for a product is donation. Many customers make product upgrade based on introduction of new product features. Oftentimes, products upgrades result in a surplus of perfectly functional products, for example, computers and electronics, that a customer may have a problem reselling. This surplus of products may be channeled to charity donations, through for example, local charitable organizations. As the end of the product consumption cycle approaches, the customer may be sent, for example, an e-mail with a message such as "You can submit your XYZ TV Q12011 product for a tax-deductable donation to LocalGoodAtZip99999 charity." The customer may also be provided with a hyperlink to information about the charity, and may be provided with a suggested value of the product based on the condition of the product.

Example 3

Proposal for Consumable Product Subscription

Based on Prior Customer Input:

| Type | Value | Units | End of Use | Destination | Submitted | Customer | Product |
|---|---|---|---|---|---|---|---|
| Actual | 30 | Days | Fully consumed | N/A | Jan. 01, 2012 | Michael B. | ABC Detergent 64Oz |

After completing a consumption cycle for a consumable product, such as paper towels or detergent or at the time of, or after purchasing a replacement for the consumed product a customer may supply an actual consumption timeline for the product. The customer may then be offered a subscription (repeated shipment) of the consumable item with shipment frequency close to the actual consumption cycle, possibly at a discount. The customer may be sent, for example, an e-mail with a message such as "Would you like to order ABC Detergent 64 Oz every 4 weeks at 15% discount?" The customer may also be provided with a hyperlink to information about how to order the recurring shipment.

Example 4

Proposal for Age Upgrade

Based on Prior Customer Input:

| Type | Value | Units | End of Use | Destination | Submitted | Customer | Product |
|---|---|---|---|---|---|---|---|
| Projected | 3 | Years | Consumer match (age) | Not specified | Jan. 01, 2012 | Steve K. | Kid's Bike 2-5yo |

At the time of purchase or thereafter, a customer supplies a projected consumption cycle for an age-specific product, such as children's clothing, toys, games, or sports-related items. Prior to, or at the end of the specified consumption cycle, the customer may be offered a similar product for the next consecutive age group. The customer may be sent, for example, an e-mail with a message such as "Please check out new Kid's Bike 5-8 yo." The customer may also be provided with a hyperlink to information about the new product.

Example 5

Proposal for Line/Fashion Upgrade

Based on Prior Customer Input:

| Type | Value | Units | End of Use | Destination | Submitted | Customer | Product |
|---|---|---|---|---|---|---|---|
| Projected | 1 | Years | Consumer match (fashion) | Not specified | Jan. 01, 2012 | Nancy M. | 3 button jacket by CoolBrand |

At the time of purchase or thereafter, a fashion-sensitive customer provides a projected consumption cycle for a product, for example a product in an apparel/shoes/accessory category, indicating product going out of fashion as a reason for end of use. At the end of the specified consumption cycle, the customer may be offered a similar product matching the upcoming fashion trend. The customer may be sent, for example, an e-mail with a message such as "Please check out new 5-button jacket by CoolBrand (2013 Collection)." The customer may also be provided with a hyperlink to information about the new product.

Example 6

Proposal for Extended Warranty

Based on Prior Customer Input:

| Type | Value | Units | End of Use | Destination | Submitted | Customer | Product |
|---|---|---|---|---|---|---|---|
| Projected | 2.5 | Years | Product Breaks | Not specified | Jan. 01, 2012 | Nancy M. | SuperEasyToUse Laptop 2011 |

A customer buys a product, for example, a product in a consumer electronics category, with expectation that a product may physically break or otherwise become non-functional after a period of time. The customer may be offered a replacement warranty for the product that exceeds product lifespan expected by the customer. The customer may be sent, for example, an e-mail with a message such as "You may consider buying extended 3 year replacement warranty for you SuperEasyToUse laptop." The customer may also be provided with a hyperlink to information about the warranty.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method comprising:
   responsive to a purchase of a product by a purchaser:
   a store computer system receiving from the purchaser at the time of the purchase a purchaser-selected one of an end of use criteria for the product from a plurality of end of use criteria, wherein the one of an end of use criteria is selected from the group consisting of: obsolete technology, fully consumed, consumer match, and product breaks;
   the store computer system determining a length of a consumption cycle of the product based on the purchaser-selected one of an end of use criteria;
   the store computer system receiving from the purchaser at the time of the purchase a purchaser-selected one of a product destination for the product from a plurality of product destinations, wherein the purchaser-selected one of a product destination is selected from the group consisting of: donation, recycle, and dispose of;
   the store computer system recording information identifying the purchaser, the product, and the length of the consumption cycle in an electronic database;
   the store computer determining content of a message to transmit to the purchaser, wherein the content of the message recommends to the purchaser another product for purchase based on the purchaser-selected one of an end of use criteria and recommends a manner for disposal of the purchased product based on the purchaser-selected one of a product destination for the product purchased; and
   the store computer system transmitting the message to the purchaser proximate expiration of the consumption cycle.

2. The method of claim 1, wherein the method further comprises the store computer system receiving actual product usage data from the purchaser and determining a length of the consumption cycle according to the actual product usage data from the purchaser.

3. The method of claim 1, wherein the message includes a marketing offer for a replacement product.

4. The method of claim 1, wherein the method further comprises the computer system receiving from the purchaser a product disposal method and wherein the message includes information regarding disposal of the product.

5. The method of claim 4, wherein the store computer system receiving an end of use criteria more specifically comprises receiving from the purchaser an indication regarding end of use of the product based on obsolete technology of the product and wherein the message includes information regarding a new item which is an updated version of the product.

6. The method of claim 5, wherein the store computer system receiving a product destination criteria more specifically comprises receiving from the purchaser an indication that the product will be donated to charity at the end of use and wherein the message includes information regarding donation to a charity which is local to the purchaser.

7. The method of claim 5, wherein the store computer system receiving an end of use criteria more specifically comprises receiving from the purchaser an indication regarding the age group of a user of the product and wherein the message includes information regarding a new item related to the product for a subsequent age group.

8. The method of claim 5, wherein the wherein the store computer system receiving an end of use criteria more specifically comprises receiving from the purchaser an indication regarding end of use of the product based on fashion trends and wherein the message includes information regarding a new item related to the product and related to current fashion trends.

9. The method of claim 1, wherein the store computer system receiving an end of use criteria more specifically comprises receiving from the purchaser an indication regarding end of use of the product when it is expected to become non-functional and wherein the message includes an offer for an extended warrantee for the product.

10. The method of claim 9, wherein the method further comprises the store computer system receiving an expected product lifespan from the purchaser and wherein the extended warrantee exceeds the expected product lifespan of the product.

11. A computer system facilitating the collection and analytical processing of product consumption timelines, the system comprising:
an interface; and
a processor coupled to the interface and programmed, responsive to a purchase of a product by a purchaser, to:
receive, from the purchaser, at the time of the purchase a purchaser-selected one of an end of use criteria for the product from a plurality of end of use criteria, wherein the one of an end of use criteria is selected from the group consisting of: obsolete technology, fully consumed, consumer match, and product breaks;
determine a length of a consumption cycle of the product based on the purchaser-selected one of an end of use criteria;
receive from the purchaser at the time of the purchase a purchaser-selected one of a product destination for the product from a plurality of product destinations, wherein the purchaser-selected one of a product destination is selected from the group consisting of: donation, recycle, and dispose of;
record information identifying the purchaser, the product, and the length of the consumption cycle in an electronic database;
determine content of a message to transmit to the purchaser, wherein the content of the message recommends to the purchaser another product for purchase based on the purchaser-selected one of an end of use criteria and recommends a manner for disposal of the purchased product based on the purchaser-selected one of a product destination for the product purchased; and
cause the message to be transmitted to the purchaser proximate expiration of the consumption cycle.

12. The system of claim 11, wherein the processor is programmed to receive actual product usage data from the purchaser and determine a length of the consumption cycle according to the actual product usage data from the purchaser.

13. The system of claim 11, wherein the message includes a marketing offer for a replacement item related to the product.

14. The system of claim 13, wherein the message is transmitted to the purchaser by mail, email, digital messaging, or telephone.

15. The system of claim 11, wherein the processor is programmed to receive from the purchaser a product disposal method and wherein the message includes information regarding disposal of the product.

16. The system of claim 11, wherein the processor is more specifically programmed to receive an end of use criteria from the purchaser indicating end of use of the product based on obsolete technology of the product and wherein the message includes information regarding a new item which is an updated version of the product.

17. The system of claim 11, wherein the processor is more specifically programmed to receive a product destination criteria from the purchaser indicating that the product will be donated to charity at the end of use of the product and wherein the message includes information regarding donation to a charity which is local to the purchaser.

18. The system of claim 11, wherein the processor is more specifically programmed to receive an end of use criteria from the purchaser indicating end of use of the product based on the age group of a user and wherein the message includes information regarding a new item related to the product for a subsequent age group.

19. The system of claim 11, wherein the processor is more specifically programmed to receive an end of use criteria from the purchaser indicating end of use of the product based on fashion trends and wherein the message includes information regarding a new item related to the product for current fashion trends.

20. The system of claim 11, wherein the processor is more specifically programmed to receive an end of use criteria from the purchaser indicating end of use of the product based on expected non-functionality based on product age and wherein the message includes information regarding an extended warrantee for the product which exceeds the expected product age.

* * * * *

UNITED STATES PATENT AND TRADEMARK OFFICE
CERTIFICATE OF CORRECTION

| | | |
|---|---|---|
| PATENT NO. | : 8,626,562 B2 | Page 1 of 1 |
| APPLICATION NO. | : 13/397326 | |
| DATED | : January 7, 2014 | |
| INVENTOR(S) | : Ilya Milman | |

It is certified that error appears in the above-identified patent and that said Letters Patent is hereby corrected as shown below:

In the Claims
Col. 16, Line 53, Claim 8 should read
8. The method of claim 5, ~~wherein the~~ wherein the store computer system receiving an end of use criteria more specifically comprises receiving from the purchaser an indication regarding end of use of the product based on fashion trends and wherein the message includes information regarding a new item related to the product and related to current fashion trends.

Signed and Sealed this
Eleventh Day of March, 2014

Michelle K. Lee
*Deputy Director of the United States Patent and Trademark Office*